United States Patent
McBurney et al.

(10) Patent No.: US 6,191,731 B1
(45) Date of Patent: Feb. 20, 2001

(54) GPS RECEIVER HAVING A FAST TIME TO FIRST FIX

(75) Inventors: Paul W. McBurney, San Francisco; Jeffrey D. Sanders, San Jose, both of CA (US)

(73) Assignee: Trimble Navigation Limited, Sunnyvale, CA (US)

( * ) Notice: Under 35 U.S.C. 154(b), the term of this patent shall be extended for 0 days.

(21) Appl. No.: 09/384,086

(22) Filed: Aug. 25, 1999

(51) Int. Cl.$^7$ .................................................. H04B 7/185
(52) U.S. Cl. .................. 342/357.05; 342/357.06; 342/357.01; 701/213
(58) Field of Search .............. 342/357.01, 357.05, 342/357.06, 357.12; 701/213

(56) References Cited

U.S. PATENT DOCUMENTS

| | | | |
|---|---|---|---|
| 3,941,984 | * | 3/1976 | Chappell et al. ............... 235/150.27 |
| 5,606,506 | * | 2/1997 | Kyrtsos .............................. 364/449.1 |
| 5,787,384 | * | 7/1998 | Johnson ................................ 701/216 |
| 5,856,802 | * | 1/1999 | Ura et al. ............................... 342/357 |
| 5,874,913 | * | 2/1999 | Blanchard et al. .................. 342/352 |
| 5,973,639 | * | 10/1999 | Biacs et al. ...................... 342/357.03 |
| 6,081,230 | * | 6/2000 | Hoshino et al. ................ 342/357.06 |

* cited by examiner

*Primary Examiner*—Thomas H. Tarcza
*Assistant Examiner*—Dao L. Phan
(74) *Attorney, Agent, or Firm*—David R. Gildea

(57) ABSTRACT

A global positioning system (GPS) receiver having a fast time to first fix using the velocity of a GPS satellite and an approximate time. The GPS receiver includes a GPS antenna for receiving a GPS signal, radio frequency circuitry for downconverting and sampling the GPS signal, a reference timer for providing a reference clocking signal, a digital signal processor for receiving the sampled GPS signal, and a microprocessor for executing program codes in a memory. The digital signal processor cooperates with the microprocessor for correlating the sampled GPS signal to an internal GPS replica signal based upon the reference clocking signal. The memory includes program codes for a pseudorange detector for measuring code phase offsets, a directional cosine calculator for calculating unit vectors, a satellite velocity calculator for calculating vector velocities, a pseudorange linearizer for determining linearized pseudoranges, and a velocity-enhanced location calculator. The velocity-enhanced location calculator uses an approximate absolute time with the linearized pseudoranges, unit vectors, and velocities of five or more GPS satellites for determining a GPS-based location for the GPS receiver before receiving a Z-count in a GPS signal. The error in the approximate time may be up to at least 100 seconds.

18 Claims, 3 Drawing Sheets

GPS RECEIVER HAVING A FAST TIME TO FIRST FIX

BACKGROUND OF THE INVENTION

1. Field of the Invention

The invention relates generally to global positioning system (GPS) receivers more particularly to a GPS receiver having a fast time to first fix using only an approximate time with information for the velocity of GPS satellites.

2. Description of the Prior Art

The United States government maintains a constellation of earth orbiting satellites for a global positioning system (GPS). The GPS satellites broadcast GPS signals having location-determination information that can be received and decoded by a GPS receiver for determining a geographical location and time. In some applications for GPS receivers it is desirable or required to have a fast time to a first location fix.

GPS receivers determine location by measuring ranges to four or more GPS satellites. These ranges are termed pseudoranges because they include a term caused by a time error of the internal clock in the GPS receiver. The pseudoranges are measured by determining phase offsets between GPS pseudorandom (PRN) codes received in the GPS signals and internal GPS replica PRN codes referenced to the internal clock. The GPS receiver then determines a GPS-based time by monitoring the GPS signal until a Z-count is decoded. The GPS-based time is used to determine the times that the phase offsets were measured. The GPS-based measurement times are then used with ephemeris information that is received in the GPS signals for calculating the instantaneous locations-in-space of several GPS satellites and for linearizing locations equations relating the calculated locations-in-space to the measured pseudoranges. Having four or more linearized equations for four or more GPS satellites, respectively, the GPS receiver can resolve the three dimensions of geographical location of the GPS receiver and correct the error in the internal clock time.

Existing GPS receivers are typically specified as having an intrinsic geographical location accuracy of about twenty meters with no degradation due to selective availability and a location accuracy of about one-hundred meters with selective availability at current levels. In order to achieve these accuracies the GPS receiver must determine or obtain an accurate time either during or before resolving location in order to calibrate the measurement times to GPS-based time. An error in the time calibration causes errors in the calculations of the locations-in-space of the GPS satellites and typically results in an inaccurate location. In most existing GPS receivers, the first accurate location fix requires that accurate GPS time be obtained in the Z-count in the GPS signal. Unfortunately, the Z-count repeats only every six seconds. Further, brief outages caused by foliage or buildings as the GPS receiver is moving can cause dropouts in the GPS signal with the result that one or more Z-counts may be missed before GPS-based time can be determined. Some workers have attempted to eliminate the need for waiting for the Z-count by using an atomic clock for providing an accurate internal clock time or a radio receiver for receiving an external standard time signal. However, such additional hardware can add significantly to the cost of the GPS receiver.

There is a need for a GPS receiver having a fast time to an accurate first fix before receiving a Z-count without the requirement for costly additional hardware.

SUMMARY OF THE INVENTION

It is therefore an object of the present invention to provide a fast time to first fix when only an approximate time is known by using calculated velocities of the GPS satellites to model the errors in the satellite ranges due to the error in the approximate time.

Briefly, in a preferred embodiment, a GPS receiver of the present invention includes a GPS antenna for receiving a GPS signal, radio frequency circuitry for downconverting and sampling the GPS signal, a reference timer for providing a reference clocking signal, a digital signal processor for receiving the sampled GPS signal, and a microprocessor for executing program codes stored in a memory. The digital signal processor cooperates with the microprocessor for correlating the sampled GPS signal to an internal GPS replica signal based upon the reference clocking signal. The correlation times and data within the GPS signal are then used for determining an accurate GPS-based time and a geographical location fix.

The memory includes program codes for a pseudorange detector for measuring code phase offsets, a directional cosine calculator for calculating unit vectors, a satellite velocity calculator for computing vector velocities, a pseudorange linearizer for determining linearized pseudoranges, and a velocity-enhanced location calculator. The velocity-enhanced location calculator uses an approximate absolute time with the linearized pseudoranges, unit vectors and velocities of five or more GPS satellites for determining a GPS-based location for the GPS receiver. The error in the approximate time may be up to at least 100 seconds.

An advantage of the present invention is that an accurate first fix can be obtained without accurate knowledge of time, thereby eliminating a need to wait for a Z-count in a GPS signal or to receive an accurate time from another source.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
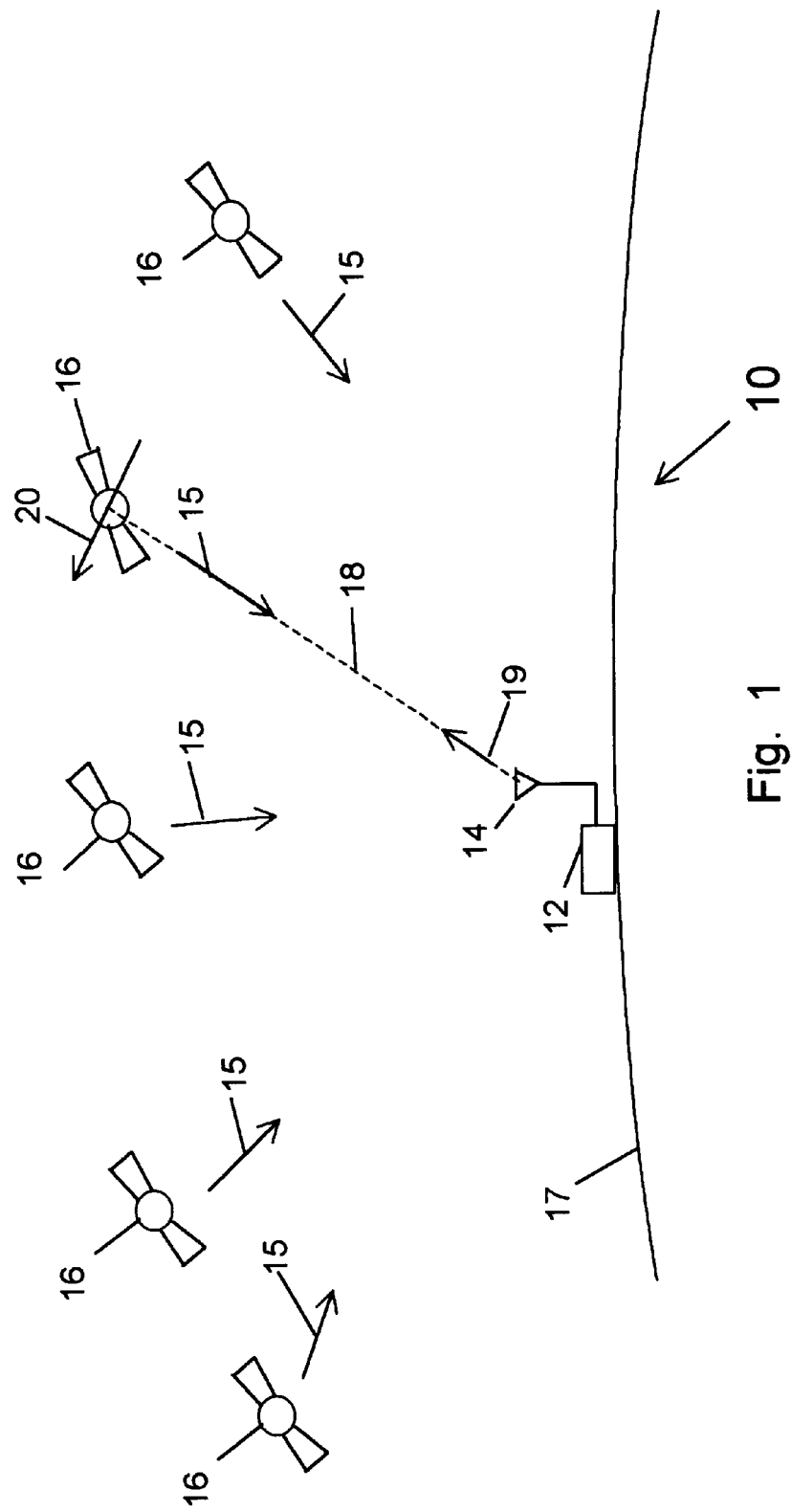
FIG. 1 is a drawing of the global positioning system (GPS) including the GPS receiver of the present invention.

FIG. 1 is a block diagram of the global positioning system (GPS) 10 including a GPS receiver of the present invention referred to by the general reference number 12. The GPS receiver 12 includes a GPS antenna 14 for receiving GPS signals 15 from GPS satellites 16 or other GPS signal sources. Within the spirit of the present invention a similar signal receiver could be constructed for receiving GLONASS signals from GLONASS satellites. The GPS signal 15 from each of the GPS satellites 16 has an L-band carrier signal modulated by GPS data bits of twenty milliseconds that are spread by a pseudorandom (PRN) code that repeats every one millisecond. The GPS data bits and the PRN codes of all the GPS satellites 16 are synchronized to transmit at the same times beginning with 00 hours, 00 minutes, 00.000 seconds of each GPS week and continuing throughout the week. The PRN code from each GPS satellite 16 is distinct, thereby allowing a GPS receiver to distinguish the GPS signal 15 from one of the GPS satellites 16 from the GPS signal 15 from another of the GPS satellites 16. The GPS receiver 12 is shown on the surface of the earth 17. However, there is no reason that the GPS receiver 12 could not be air or space borne.

A location point of the GPS antenna 14 of the GPS receiver 12 and a location point-in-space of each one of the GPS satellites 16 defines a direct line 18. The direct line 18 in FIG. 1 is shown to only one of the GPS satellites 16 in order to reduce clutter. A vector for directional cosines 19, also termed a unit vector 19, points in the direction of the direct line 18 between the GPS receiver 12 and the GPS satellites 16, respectively. Each of the GPS satellites 16 has a vector velocity-in-space 20. In order to reduce clutter, only unit vector 19 and one vector velocity 20 is shown in FIG. 1.

The GPS data bits are organized into 1500 bit frames, also called pages, of thirty seconds. The frames are segmented into five 300 bit subframes of six seconds each. Each subframe begins with a known preamble and includes a Z-count. The Z-count gives the GPS-based time-of-transmission for the preamble. The frame in each GPS signal 15 includes ephemeris data for the GPS satellite 16 transmitting that GPS signal 15 and a portion of the almanac data for all the GPS satellites 16. Both the ephemeris data and the almanac data are time-variable orbit parameters for the locations-in-space of the GPS satellites 16. The ephemeris data is highly accurate and is updated as often as every hour. The almanac data is about 100 times less accurate and is updated about once a week. The complete almanac is transmitted by each GPS satellite 16 in twenty-five frames (pages).

Figure 2:
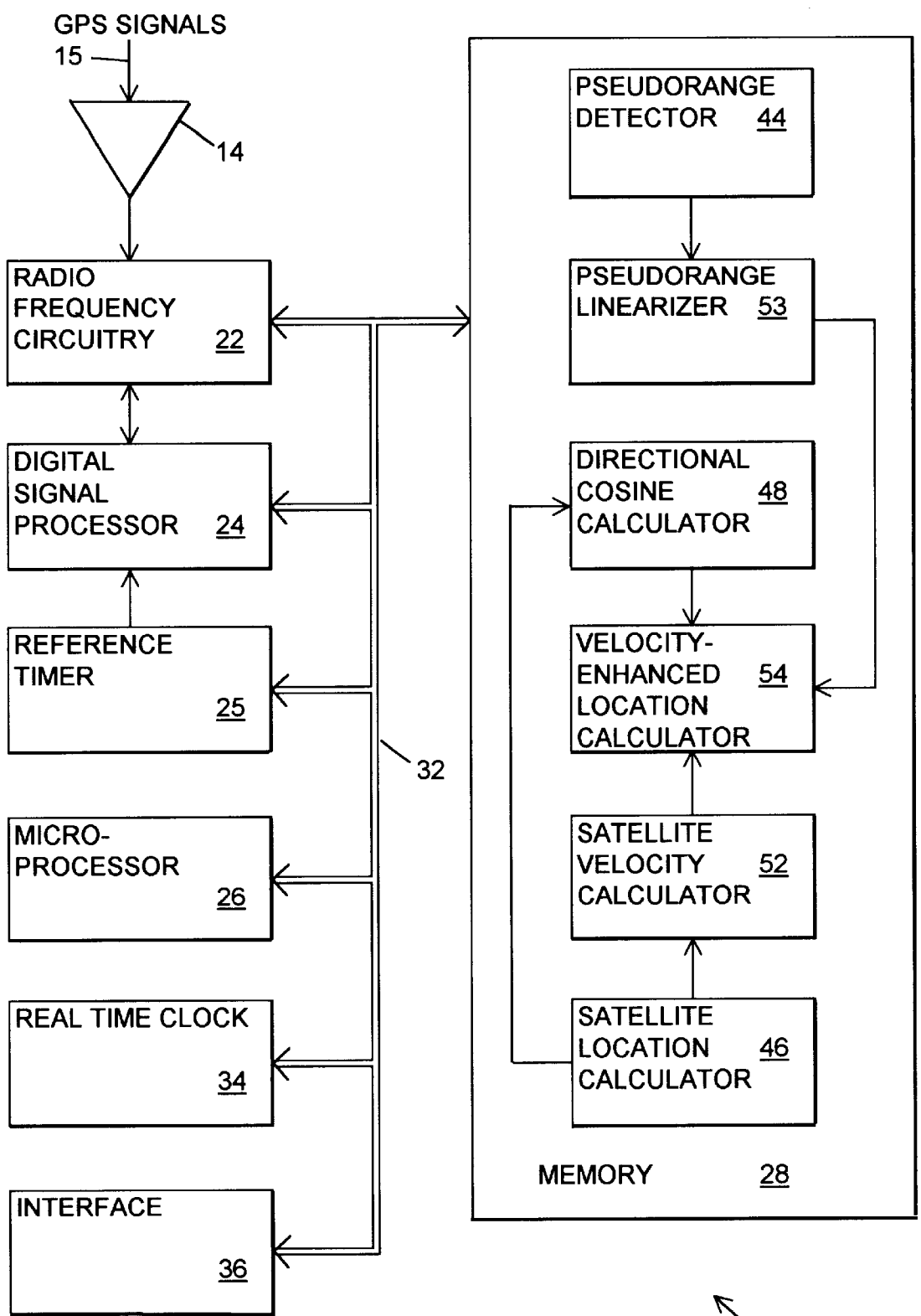
FIG. 2 is a block diagram of a GPS receiver of FIG. 1.

FIG. 2 is a block diagram of the GPS receiver 12 of the present invention. The GPS receiver 12 includes the GPS antenna 14, radio frequency circuitry 22, a digital signal processor 24, a timer 25, a microprocessor 26, and a memory 28. The GPS antenna 14 receives radio frequency (RF) GPS signals from in-view GPS satellites 16 and issues a conducted RF GPS signal having components superimposed for all the GPS satellites 16 that are in-view. It should be understood that any reference to the geographical location of the GPS receiver 12 is actually referring to the location of the GPS antenna 14. The radio frequency circuitry 22 includes local oscillators, frequency downconverters, and samplers for receiving the conducted RF GPS signal from the GPS antenna 14 and issuing a sampled GPS signal at a lower frequency to the digital signal processor 24. The sampled GPS signal simultaneously includes carriers modulated by the GPS data bits spread by the pseudorandom (PRN) code from each of the in-view GPS satellites 16.

The timer 25 provides a reference clocking signal to the digital signal processor 24 and the radio frequency circuitry 22. The radio frequency circuitry 22 uses the reference clocking signal for generating the local oscillator signals for downconverting and sampling the GPS signal.

The digital signal processor 24 includes several signal generators and correlators. The signal generators use the reference clocking signal as a time base for generating an internal receiver timer, clocking signals, and GPS replica signals. The correlators provide correlation data for the correlation between the internal GPS replica signals and the sampled GPS signal. The replica signals replicate the PRN codes for each of the GPS satellites 16 that the GPS receiver 12 is tracking or attempting to acquire. The microprocessor 26 receives the correlation data over a signal bus 32 and executes coded directions in the memory 28 for issuing responsive feedback adjustments over the bus 32 to the digital signal processor 24. The feedback adjustments offset the respective phases of the replica PRN codes with respect to the internal receiver timer to drive the replica PRN codes to correlate with the PRN codes in the sampled GPS signal and offset the respective frequencies of the replica carriers to correlate with the carrier frequencies in the sampled GPS signal. The microprocessor 26 may include several chips interconnected directly or over the bus 32 in order to perform in a conventional manner for reading and writing data in the memory 28, reading executable code, and controlling and receiving information from the elements of the GPS receiver 12. The memory 28 may include several chips or other storage devices.

An optional real time clock 34 provides an approximate absolute time to the processor 26 over the bus 32. An interface 36 coupled to the microprocessor 26 over the bus 32 enables a human user and/or electronic devices to communicate with the GPS receiver 12.

The memory 28 includes data that may be modified by the microprocessor 26 over the bus 32 and executable code that is read by the microprocessor 26 over the bus 32 for directing the operation of the microprocessor 26. The executable code in the memory 28 includes program codes for a pseudorange detector 44, a satellite location calculator 46, a directional cosine calculator 48, a satellite velocity calculator 52, a pseudorange linearizer 53, and a velocity-enhanced location calculator 54 that are used for providing a location of the GPS antenna 14 of the GPS receiver 12. Detailed operation of the program codes is illustrated in the flow chart of FIG. 3 and explained in the accompanying detailed description. Although in the preferred embodiment certain elements are implemented with stored program code in the memory 28 that is executed by the microprocessor 26, it is to be understood that there are alternative embodiments in which one or more of these elements can be implemented at least partially in circuit hardware.

Figure 3:
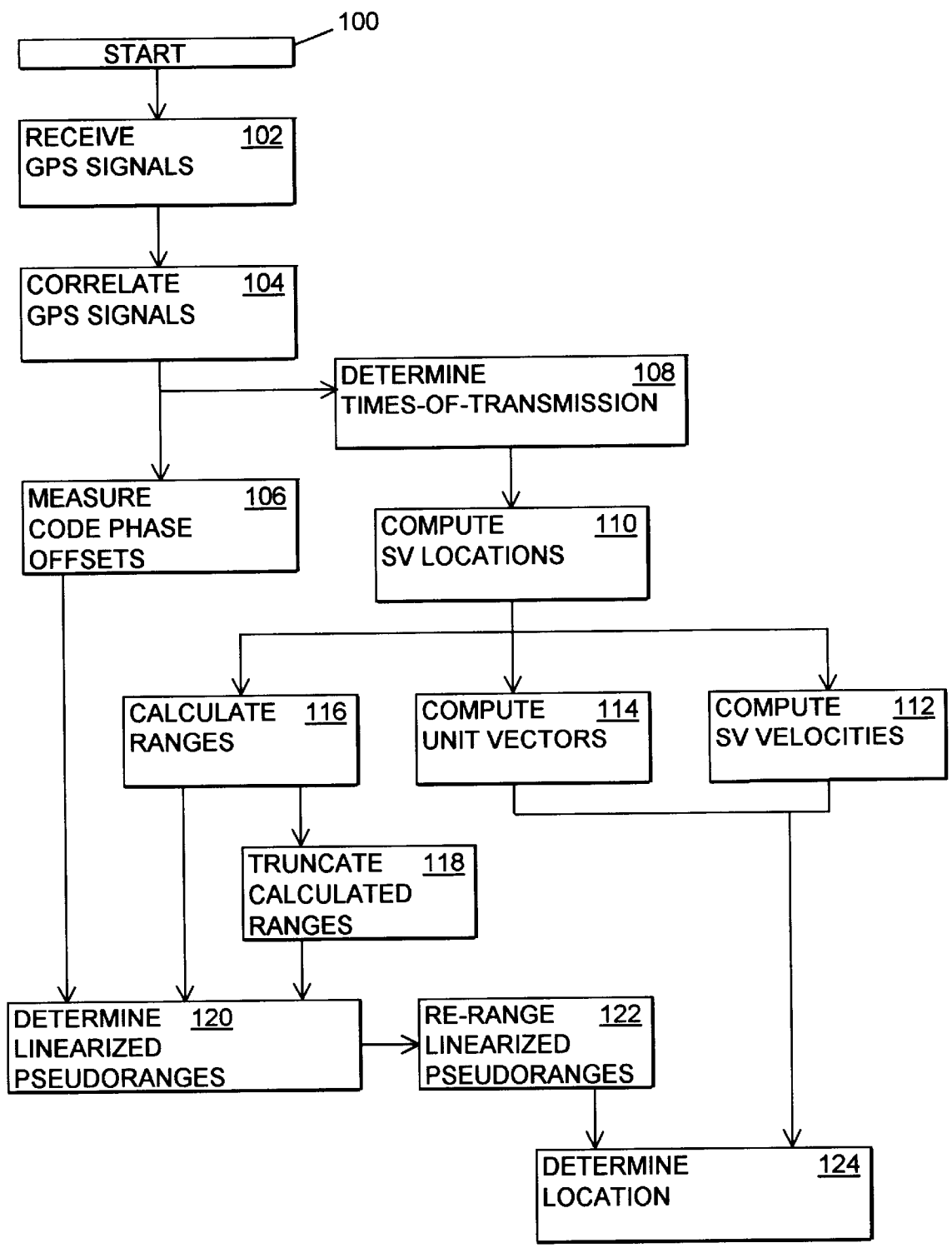
FIG. 3 is a flow chart of a method for a fast time to first fix using the GPS receiver of FIG. 2.

FIG. 3 is a flow chart of a method for a fast time to first fix in the GPS receiver 12. At the start 100 the memory 28 stores an assumed location and GPS ephemeris information for the time variable locations-in-space of several, preferably at least five, GPS satellites 16 that are in-view of the assumed location. The assumed location may be the location of the last location fix, a location received through the interface 36, a default location, or may be derived in some other way. The ephemeris information may be held over from the time of the last location fix or received through the interface 36. In a preferred embodiment, the GPS signal 15 from at least five GPS satellites 16 are processed in parallel in order to obtain a location fix. Fewer than five GPS satellites 16 may be used when other accurate location information such as altitude, map-matching, odometer readings, inertial navigation, or the like is available.

In a step 102 the GPS antenna 14 receives the RF GPS signal 15 from the in-view GPS satellites 16. The radio frequency circuitry 22 downconverts the RF GPS signal 15, samples the downconverted GPS signal, and passes the sampled GPS signal to the digital signal processor 24.

The digital signal processor 24 in a step 106 provides correlation data for the correlation of the sampled GPS signal and an internal replica code. The microprocessor 26 follows directions in the pseudorange detector 44 for adjusting the phases of the internal replica PRN codes with respect to the internal reference clocking signal and determining the phase offsets of the replica code that provide the best correlations to the PRN codes in the sampled GPS signal. The time of each of the code phase measurements is time-tagged with an approximate time that is derived from time information that is received from the real time clock 34 or through the interface 36.

In a step 108 the satellite location calculator 46 uses the measurement time-tags as times-of-transmission for the GPS signal 15 from several of the GPS satellites 16. Alternatively, the measurement time-tags may be projected backwards by an approximate transit time in a range of about sixty-four to eighty-two milliseconds, preferably about seventy-seven milliseconds for a more accurate determination of the times-of transmission.

The satellite location calculator 46 in a step 110 uses the times-of-transmission with the ephemeris data for determining the locations-in-space of the GPS satellites 16.

The satellite velocity calculator 52 in a step 112 computes the vector velocities 20 of the GPS satellites 16 from the times-of-transmission and the known orbital characteristics in the ephemeris data.

The direction cosine calculator 48 in a step 114 computes the unit vectors 19 between the assumed location of the GPS receiver 12 stored at the start 100 and locations-in-space of the GPS satellites 16. It is understood that a unit vector has coefficients in x, y, and z directions and a length of one. The x, y, and z coefficients are often termed directional cosines.

The pseudorange linearizer 53 in a step 116 calculates ranges from the assumed location of the GPS receiver 12 to the locations-in-space of the GPS satellites 16. In a step 118 the pseudorange linearizer 53 truncates the calculated ranges to an integer number of milliseconds and adds the truncated calculated ranges to the respective code phase offsets for determining measured pseudoranges. Then, in a step 120 the pseudorange linearizer 53 determines respective linearized pseudoranges for the GPS satellites 16 from the differences between the calculated ranges and the measured pseudoranges.

In a step 122, the pseudorange linearizer 53 re-ranges the linearized pseudoranges by adding or subtracting integer milliseconds, shown as M milliseconds in equation 3 below, to place the linearized pseudoranges within a window of plus and minus one-half millisecond.

The velocity-enhanced location calculator 54 in a step 124 determines a GPS-based location of the GPS receiver 12 using five location equations of the present invention of the form shown in location equation 1. The location equation 1 corresponds to the location equation for one of the GPS satellites 16 designated as "GPS satellite S1".

$$Y_{s1}=(U_{s1} \cdot V_{s1})\Delta t-(U_{s1} \cdot \Delta X_u)+b_u+n_{us1} \qquad (1)$$

In the equation 1 "$Y_{s1}$" is the linearized pseudorange for GPS satellite S1; "$U_{s1}$" is the unit vector 19 in three dimensions for the direction between the assumed location of the GPS receiver 12 and the GPS satellite S1; "$\Delta X_u$" is a vector in three dimensions for the difference between the assumed location of the GPS receiver 12 and the true GPS-based location of the GPS receiver 12 that is yet to be determined; "$V_{s1}$" is the vector velocity 20 in three dimensions of the GPS satellite S1; "$\Delta t$" is the total time error between the true GPS-based time that is yet to be determined and the approximate time used in common for calculating the locations-in-space and velocities of all the GPS satellites 16 whose GPS signal 15 is received and processed; "$b_u$" is a small, typically sub-millisecond, time error that is a small part of the total time error $\Delta t$ and is common in the code phase measurement time-tags for all the GPS satellites 16 that are measured; and "$n_{us1}$" is measurement noise from several sources including instrumentation noise, ionospheric and tropospheric model errors, and selective availability errors. The effect of the time error $b_u$ is eliminated in the simultaneous resolution of location equations described below. The effect of the noise $n_{us1}$ is to degrade the accuracy of the location that is resolved.

The location equation 1 shows that for the GPS satellite S1, the linearized pseudorange $Y_{s1}$ equals a dot product of the unit vector $U_{s1}$ and the vector velocity $V_{s1}$ multiplied by the time error $\Delta t$; minus a dot product of the unit vector $U_{s1}$ and the location difference vector $\Delta X_u$; plus the time error $b_u$; plus the noise $n_{us1}$. Neglecting the noise $n_{us1}$, the equation 1 has five unknowns—the three dimensions of the location difference $\Delta X_u$, the time error $\Delta t$, and the time error $b_u$. The location equation 1 is repeated for four additional GPS satellites 16 for a total of five simultaneous location equations having the same five unknowns. Where five location equations are used, the mathematics yields a single unambiguous location. More than five location equation equations corresponding, respectively, to more than five GPS satellites 16 can sometimes be used for an overdetermined solution for improving the accuracy of the location. In a preferred embodiment, the five equations are solved by first subtracting one of the equations from each of the other four in order to eliminate the term for the time error $b_u$ and then using matrix arithmetic on the four remaining equations. The simultaneous solution yields the location difference vector $\Delta X_u$ between the assumed location and the true GPS-base location and the absolute time error $\Delta t$. The true GPS-based location is then determined by a vector combination of the location difference vector $\Delta X_u$ and the assumed location; and the true GPS-based time is determined by combining the approximate time used for calculating locations-in-space and velocities of the GPS satellites 16 and the time error $\Delta t$. The resulting location accuracy is commensurate with the global positioning system accuracies of about twenty meters intrinsically or about one-hundred meters at current levels of selective availability that are obtained conventionally using accurate time either through the GPS signal 15 or with another accurate time standard.

Subsequent location fixes may be determined in the same way. Alternatively, because the true GPS-based time is now known, subsequent location fixes can be calculated in a conventional manner from four GPS satellites 16 without the need for the satellite velocity vector information. Eventually, when the Z-count has been received in the GPS signal 15, the GPS receiver 12 can, if desired, use the GPS-based time in the Z-count for determining location.

For best results, the velocity-enhanced location calculator 54 may avoid using the GPS satellites 16 having range rates less than about one meter per second. The range rates may be determined by calculating the dot product of the unit vector 19 ($U_{s1}$ in equation 1) and the velocity vector 20 ($V_{s1}$ in equation 1).

An equation 2, below, shows a relationship between a user pseudorange $\rho_{s1}$ and the locations of the GPS receiver 12 and the GPS satellite S1.

$$\rho_{s1}=[(x_{s1}-x_u)^2+(y_{s1}-y_u)^2+(z_{s1}-z_u)^2]^{1/2}+b_u \qquad (2)$$

The equation 2 shows that the user pseudorange $\rho_{s1}$ equals the square root of the sum of the squares of the range $(x_{s1}-x_u)$ in an "x" dimension, the range $(y_{s1}-y_u)$ in a "y" dimension, and the range $(z_{s1}-z_u)$ in a "z" dimension, where $(x_u, y_u, z_u)$ is the location of the GPS receiver 12 that is yet to be determined and $(x_{s1}, y_{s1}, z_{s1})$ is the actual location-in-space of the GPS satellite S1; plus the time error $b_u$ that is yet to be determined. In a preferred embodiment, the pseudorange linearizer 53 linearizes the equation 2 by assuming a location of the GPS receiver 12, calculating the user range between the assumed location and the calculated location-in-space S1 GPS satellite, truncating the calculated user range, determining a linearized pseudorange for the S1 GPS satellite from the difference between the calculated range and the sum of the truncated calculated range and the code phase offset, and then incrementing or decrementing by integer milliseconds until the linearized pseudoranges are in a range within plus or minus one-half millisecond. The relationship between the linearized pseudorange, the calculated range, the truncated calculated range, and the code phase measurement is shown in an equation 3.

$$Y_{s1} = r_{cs1} - (r_{tcs1} + \Phi \pm M) \quad (3)$$

The equation 3 shows that the linearized pseudorange $Y_{s1}$ equals the calculated range $r_{cs1}$, minus the sum of the truncated calculated range $r_{tcs1}$ and the code phase offset $\Phi$, plus or minus M integer milliseconds. An equation 4 is developed by taking partial derivatives of the equation 2 using the assumed location of the GPS receiver 12 and the calculated location-in-space of the GPS satellite S1, and then combining with the equation 3.

$$Y_{s1} = (U_{s1} \cdot \Delta \underline{X}_{s1}) - (U_{s1} \cdot \Delta X_u) + b_u + n_{us1} \quad (4)$$

The equation 4 shows that the linearized pseudorange $Y_{s1}$ equals a dot product of the unit vector $U_{s1}$ and a satellite motion vector $\Delta \underline{X}_{s1}$, plus a dot product of the unit vector $U_{s1}$ and the user location difference vector $\Delta X_u$, plus the time error $b_u$; plus the noise $n_{us1}$. The satellite motion vector $\Delta \underline{X}_{s1}$ represents the travel of the S1 GPS satellite during the time error $\Delta t$. The equation 4 has seven unknowns—the three dimensions of the satellite motion vector $\Delta \underline{X}_{s1}$ for the S1 GPS satellite, the three dimensions of the location difference vector $\Delta X_u$ for the GPS receiver 12, and the time error $b_u$; and the noise $n_{us1}$. Unfortunately, multiple equations for multiple GPS satellites 16 can not be used for resolving the equation 4 because each new equation having satellite motion vectors $\Delta \underline{X}_{s1}$ for an ith GPS satellite adds three more unknowns. However, for relatively short periods of time the satellite motion vector $\Delta \underline{X}_{s1}$ can be approximated as traveling in a straight line of the vector velocity 20. This enables the velocity-enhanced location calculator 54 to approximate the satellite motion vector $\Delta \underline{X}_{s1}$ as the vector velocity 20 for the S1 GPS satellite times the time error $\Delta t$ between the true GPS-based time that is yet to be determined and the estimated time used for calculating the location-in-space and velocity $V_{s1}$ of the S1 GPS satellite as shown in equation 5.

$$\Delta \underline{X}_{s1} = V_{s1} * \Delta t \quad (5)$$

The equation 5 shows that the satellite location motion vector $\Delta X_{s1}$ approximately equals the vector velocity $V_{s1}$ multiplied by the time error $\Delta t$.

Importantly, the approximation in the equation 5 substitutes the one unknown for the time error $\Delta t$ and the calculated vector velocity $V_{s1}$ of the S1 GPS satellite for three unknowns for the satellite location motion vector $\Delta \underline{X}_{s1}$. The unknown time error $\Delta t$ is not dependent on which of the GPS satellites 16 is measured, therefore, using multiple equations for multiple GPS satellites 16 does not increase the number of unknowns. The combination of the equation 5 and the equation 4 yields the location equation 1 that is used in the velocity-enhanced location calculator 54.

The approximation in the equation 5 causes a location error for the GPS receiver 12 due to the second order effect of the accelerations of the GPS satellites 16 due to the curvatures of their orbits. Using one centimeter per second squared as the constant for the second order term relating time to location-in-space, a time error $\Delta t$ of one second in the approximate time as compared to the true GPS based time results in a location error of about five millimeters times a dilution of precision (DOP) or about one and one-half centimeters for a DOP of three. A time error $\Delta t$ of ten seconds in the approximate time results in a location error of about one-half meter times the dilution of precision (DOP) or about one and one-half meters for a DOP of three. A time error $\Delta t$ of one-hundred seconds in the approximate time results in a location error of about fifty meters times the DOP or about and one-hundred fifty meters for a DOP of three. In order to use an approximate time having a time error $\Delta t$ of about one-hundred seconds or more, the velocity-enhanced location calculator 54 iterates the resolution of the geographical location and GPS-based time using a progressively more accurate assumed location and time error $\Delta t$. Using iterations, an accurate location can typically be resolved where the time error $\Delta t$ in the approximate time is up to at least five minutes. Using standard commercially available hardware and reasonable microprocessor clock rates, the iterations may be processed rapidly so that several such iterations may be completed in far less time than the six second time period of the Z-counts.

Differential GPS pseudorange corrections can be used for improving the accuracy of the geographical location resolved with the location equation 1, above, by replacing the linearized pseudorange $Y_{s1}$ with a difference between the linearized pseudorange $Y_{s1}$ and the differential GPS correction for the S1 GPS satellite. Corresponding changes can be made for the location equations for other GPS satellites 16 used for resolving the location. Alternatively, location accuracy can be improved by the applying differential GPS corrections for latitude, longitude, and altitude (or other three dimensional coordinate system) to the latitude, longitude, and altitude (or other system) of the location resolved by the GPS receiver 12.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A positioning receiver, comprising:
   a velocity calculator for using source location data pertaining to a positioning signal source for computing a vector velocity of said positioning signal source, said positioning signal source having a different motion than the receiver; and
   a velocity-enhanced location calculator for using said velocity vector and an approximate time for resolving a geographical location of the receiver.

2. The positioning receiver of claim 1, wherein:
   said positioning signal source is a global positioning system (GPS) satellite.

3. The positioning receiver of claim 1, wherein:
   said positioning signal source is a global orbiting navigation system (GLONASS) satellite.

4. The receiver of claim 1, further comprising:
   a pseudorange detector for measuring a code phase offset pertaining to said positioning signal source;
   a signal source location calculator for using said approximate time and said source location data for computing a location-in-space for said positioning signal source;

a directional cosine calculator for computing a unit vector between an assumed location of the receiver and said location-in-space; and a pseudorange linearizer for calculating a range between said assumed location and said location-in-space, and using said code phase offset and said calculated range for determining a linearized pseudorange; and wherein: the velocity-enhanced location calculator is further for using said linearized pseudorange and said unit vector for resolving said location of the receiver.

5. The receiver of claim 4, wherein:

the pseudorange linearizer is further for truncating said calculated pseudorange and using said truncated calculated pseudorange for determining said linearized pseudorange.

6. The receiver of claim 4, wherein:

the pseudorange linearizer is further for re-ranging said linearized pseudorange for placing said linearized pseudorange within a window of plus and minus one-half millisecond.

7. The receiver of claim 4, wherein:

the velocity-enhanced location calculator is further for using a location equation having a product of said unit vector and said velocity vector for resolving said location of the receiver.

8. The positioning receiver of claim 1, wherein:

said approximate time differs from a true positioning signal based time in a range of about one second to about one-hundred seconds.

9. A method in a positioning receiver, comprising steps of:

computing a vector velocity for a positioning signal source from source location data pertaining to said positioning signal source, said positioning signal source having a different motion than the receiver; and resolving a geographical location of said receiver using said velocity vector and an approximate time.

10. The method of claim 9, wherein:

said positioning signal source is a global positioning system (GPS) satellite.

11. The method of claim 9, wherein:

said positioning signal source is a global orbiting navigation system (GLONASS) satellite.

12. The method of claim 9, further comprising steps of:

measuring a code phase offset pertaining to said positioning signal source;

computing a location-in-space for said positioning signal source from said approximate time and said source location data;

computing a unit vector between an assumed location of the receiver and said location-in-space;

calculating a range between said assumed location and said location-in-space for providing a calculated range; and determining a linearized pseudorange from said calculated range and said code phase offset; and wherein:
 the step of resolving said location of said receiver further includes using said linearized pseudorange and said unit vector.

13. The method of claim 12, further comprising step of:

truncating said calculated pseudorange; and wherein:
 the step of determining said linearized pseudorange includes using said truncated calculated pseudorange.

14. The method of claim 12, wherein:

the step of determining said linearized pseudoranges further includes re-ranging said linearized pseudoranges for placing said linearized pseudoranges within a window of plus and minus one-half millisecond.

15. The method of claim 12, wherein:

the step of resolving said geographical location includes using a location equation having a product of said unit vector and said velocity vector.

16. The method of claim 9, wherein:

said approximate time differs from a true positioning signal based time in a range of about one second to about one-hundred seconds.

17. The receiver of claim 1, further comprising:

a signal source location calculator for using said approximate time and said source location data for computing a location-in-space for said positioning signal source;

a directional cosine calculator for computing a unit vector between an assumed location of the receiver and said location-in-space; and wherein:
 the velocity-enhanced location calculator uses said velocity vector and said unit vector for calculating a range rate and uses said range rate and said approximate time for resolving said geographical location.

18. The method of claim 9, further comprising steps of:

computing a location-in-space for said positioning signal source based upon said approximate time and said source location data; and computing a unit vector between an assumed location of the receiver and said location-in-space; and wherein:
 the step of resolving said geographical location includes steps of calculating a range rate using said velocity vector and said unit vector; and calculating said geographical location using said range rate and said approximate time.

* * * * *